(12) United States Patent
Enqvist

(10) Patent No.: US 11,924,650 B2
(45) Date of Patent: Mar. 5, 2024

(54) SYSTEM, METHOD AND SERVICE PRODUCT FOR CONTENT DELIVERY

(71) Applicant: COMPTEL OYJ, Helsinki (FI)

(72) Inventor: Juhana Enqvist, Espoo (FI)

(73) Assignee: COMPTEL OYJ, Helsinki (FI)

( * ) Notice: Subject to any disclaimer, the term of this patent is extended or adjusted under 35 U.S.C. 154(b) by 733 days.

(21) Appl. No.: 15/187,180

(22) Filed: Jun. 20, 2016

(65) Prior Publication Data
US 2016/0295429 A1    Oct. 6, 2016

Related U.S. Application Data

(63) Continuation of application No. PCT/FI2014/050961, filed on Dec. 8, 2014.

(30) Foreign Application Priority Data

Dec. 20, 2013    (FI) ..................................... 20136303

(51) Int. Cl.
*H04W 24/02*    (2009.01)
*H04W 4/18*    (2009.01)
(Continued)

(52) U.S. Cl.
CPC ............. *H04W 24/02* (2013.01); *H04W 4/18* (2013.01); *H04W 28/0268* (2013.01); *H04W 84/042* (2013.01); *H04W 84/12* (2013.01)

(58) Field of Classification Search
CPC ... H04W 24/02; H04W 4/18; H04W 28/0268; H04W 28/08; H04W 84/02; H04W 84/12
See application file for complete search history.

(56) References Cited

U.S. PATENT DOCUMENTS 6,366,780 B1 *    4/2002    Obhan .............. H04W 28/0808
                                                370/329
2004/0085909 A1    5/2004    Soliman
(Continued)

FOREIGN PATENT DOCUMENTS

EP            2403290 A1    1/2012
WO    WO-2004112302 A2    12/2004

OTHER PUBLICATIONS

International Preliminary Report on Patentability completed Mar. 22, 2016 in corresponding International Application No. PCT/FI2014/050961, 6 pages.
(Continued)

Primary Examiner — Joseph A Bednash

(57) ABSTRACT

A system, method and computer program product for content delivery of services in a mobile telecommunication network on the basis of predictions of user and network needs. The method includes collecting and receiving information of the use of services in the network, and analyzing network behavior on the basis of the information received. The traffic load in the network is continuously monitored in real-time by estimating the traffic load locations in the network and the network capacity needs for delivering the services. The analysis is used for deciding the optimal network configuration to be used for supporting the estimated traffic load locations in the network. The network behavior is controlled based on the selections and decisions of the analysis by sending requests to network components for network configuration.

21 Claims, 2 Drawing Sheets

(51) Int. Cl.
*H04W 28/02* (2009.01)
*H04W 84/12* (2009.01)
*H04W 84/04* (2009.01)

(56) References Cited

U.S. PATENT DOCUMENTS

| | | | |
|---|---|---|---|
| 2009/0031384 A1 | 1/2009 | Brooks et al. | |
| 2011/0213869 A1* | 9/2011 | Korsunsky | G06F 21/55 709/223 |
| 2011/0255555 A1 | 10/2011 | Alexander | |
| 2012/0131601 A1 | 5/2012 | McDysan et al. | |
| 2012/0159558 A1* | 6/2012 | Whyte | H04N 21/222 725/95 |
| 2012/0311126 A1* | 12/2012 | Jadallah | H04L 65/80 709/224 |
| 2013/0089302 A1 | 4/2013 | Barnea et al. | |
| 2013/0091249 A1 | 4/2013 | McHugh et al. | |
| 2013/0138795 A1* | 5/2013 | Field | H04N 21/2221 709/224 |
| 2013/0144750 A1* | 6/2013 | Brown | G06F 16/4387 705/26.7 |
| 2014/0280679 A1* | 9/2014 | Dey | H04L 67/568 709/213 |
| 2015/0019676 A1* | 1/2015 | Fablet | H04L 67/26 709/213 |
| 2015/0201223 A1* | 7/2015 | Osorio | H04N 21/2183 725/82 |

OTHER PUBLICATIONS

International Search Report dated Mar. 19, 2015 in corresponding International Application No. PCT/FI2014/050961, 4 pages.
Finnish Search Report dated Aug. 26, 2014 in corresponding Finnish Patent Application No. 20136303, 1 page.

* cited by examiner

SYSTEM, METHOD AND SERVICE PRODUCT FOR CONTENT DELIVERY

CROSS-REFERENCE TO RELATED APPLICATIONS

The present application is a continuation of PCT Application No. PCT/FI2014/050961 filed Dec. 8, 2014, which claims priority to Finnish Patent Application Serial No. 20136303 filed Dec. 20, 2013, the entire disclosure of each of which is incorporated herein by reference in their entirety.

TECHNICAL FIELD

The invention is concerned with a system, method and service product for content delivery of services in a mobile telecommunication network on the basis of estimation and predictions of network capacity needs.

BACKGROUND

Content delivery (also called digital distribution, online distribution (of downloadable content), or electronic software distribution (ESD), among others) describes the delivery of media content, such as audio, video, software and video games, without the use of physical media, usually over online delivery mediums, such as the Internet.

Delivery of downloadable content became more usual with the advancement of network bandwidth capabilities. Content distributed online may be streamed or downloaded. Streaming involves downloading and using content "on-demand" as it is needed. Fully downloading the content to a hard drive or other form of storage media allows for quick access.

Streaming media is multimedia that is constantly received by and presented to an end-user while being delivered by a provider. Thus, a client device can begin playing the data (such as a movie) before the entire file has been transmitted.

A delivery network help distribute content over the Internet by ensuring both high availability and high performance and a content delivery network or content distribution network (CDN) is built as a software layer over the Internet in a large distributed system of servers and computers containing copies of data deployed in multiple data centers across the Internet. They are placed at various points in the network so as to maximize bandwidth for access to the data from clients throughout the network. A client accesses a copy of the data near to the client, as opposed to all clients accessing the same central server, so as to avoid bottleneck near that server.

A Content Delivery Network (CDN) can accelerate entire web or IP-based applications and work as media delivery networks that provide high quality delivery of live and on-demand media. CDNs serve a large fraction of the Internet content today, including web objects (text, graphics and scripts), downloadable objects (media files, software, documents), applications (e-commerce, portals), live streaming media, on-demand streaming media, and social networks.

Alternative technologies for content delivery include peer-to-peer (P2P) file sharing technologies. CDNs also might use a hybrid model that uses P2P technology. In the hybrid model, content is served using both dedicated servers and other peer-user-owned computers as applicable.

In cellular networks, the service layer is a conceptual layer within a network architecture. It aims at providing middleware that serves third-party value-added services and applications at a higher application layer. The service layer provides servers owned by a telecommunication network and accessed by application layer servers owned by third-party content providers.

A mobile content delivery network or mobile content distribution network (Mobile CDN) is a network of servers—systems, computers or devices—that cooperate transparently to optimize the delivery of content to end users on any type of wireless or mobile network. Like traditional CDNs, the primary purpose of a Mobile CDN is to serve content to end users with high availability and high performance. In addition, Mobile CDNs can be used to optimize content delivery for the unique characteristics of wireless networks and mobile devices, such as limited network capacity, or lower device resolution. Added intelligence around device detection and content adaptation can help address challenges inherent to mobile networks which have high latency, higher packet loss and huge variation in download capacity.

Content delivery networks (CDN) can be realized over middleware. Middleware connects software components, applications or systems. Middleware is computer software that provides services to software applications that enables communication and management of data. The middleware works as a software layer that lies between the operating system and applications on each side of a distributed computing system in a network.

A CDN operator gets paid by content providers for delivering their content to their end-users. Usually, however, in mobile content delivery networks, the user of the content pays for the data traffic of its own frequency band, but alternatively, the content provider might pay for the consumed frequency band to the network operator and thereafter charge the user directly or through service fees. This additional cost can also be charged from advertisers, whose advertisements the CDN operator show for the consumers. Besides better performance and availability, CDNs also offload the traffic served directly from the content provider's origin infrastructure, resulting in cost savings for the content provider.

A mobile application (or mobile app) is a software application designed to run on smartphones, tablet computers and other mobile devices. They are usually available through application distribution platforms, which are typically operated by the owner of the mobile operating system, such as the Apple App Store, Google Play, Windows Phone Store, and BlackBerry App World. Some apps are free, while others must be bought. Usually, they are downloaded from the platform to a target device, such as an iPhone, BlackBerry, Android phone or Windows Phone, but sometimes they can be downloaded to laptops, tablet computers or desktops. Mobile apps are offered e.g. for information retrieval, including e-mail, calendar, contacts, and stock market and weather information and nowadays also for categories, such as mobile games, GPS and location-based services, and ticket purchases.

A "mashup" is a web application that combines services from different websites into a single website or just generally uses content from more than one source to create a single new service displayed in a single graphical interface. New results can thus be produced from raw source data that was originally produced for other reasons. Mashups are most commonly a combination of maps and search-locator services but can also be mashups that include customized tv or social media based on users desires by combining e.g. content from TV, Twitter, Facebook, Google+, YouTube, News, web services, etc. There are service providers that offer Mash up contents, also called Mashup (service) providers.

An over-the-top (OTT) application is any app or service that provides a product over the Internet and bypasses traditional distribution referring to services used over network services. The growing popularity of such over-the-top (OTT) services has led to a huge rise in data traffic over mobile networks. The coming of smartphones and other user devices with multimedia and advanced communication functions has revolutionized over-the-top (OTT) services, since they involve voice and video services over wireless networks.

Over-the-top content (OTT) refers to delivery of video, television, audio and other services over the Internet without the system operator being involved in the control or distribution of the content itself. As the owner of the mobile network, the system operator is in a unique position to differentiate itself by ensuring the best experience for its customers but still their profitability is threatened since they do not necessarily generate the required revenue to support the investment needed.

A fundamental problem is that all network resources are limited. Network congestion occurs when a link or node is carrying so much data that its quality of service deteriorates. Many things can happen to packets as they travel from origin to destination. Typical effects include queuing delay, latency, packet loss or the blocking of new connections leading to insufficient or decreased network throughput.

Low throughput is caused by varying load from other users sharing the same network resources, the bit rate (the maximum throughput) that can be provided to a certain data stream may be too low for real-time multimedia services if all data streams get the same scheduling priority.

Dropped packets are caused by routers when they fail to deliver some packets if their data is corrupted or they arrive when their buffers are already full.

Sometimes packets are corrupted due to bit errors caused by noise and interference, especially in wireless communications, leading to delivery or packets with errors.

Latency takes place when it takes a long time for each packet to reach its destination, because it gets held up in long queues, or takes a less direct route to avoid congestion.

Packets from the source might reach the destination with different delays and via different routes. The variation in delay is known as jitter and can seriously affect the quality of streaming audio and/or video.

Modern networks use congestion control and congestion avoidance techniques to try to avoid congestion collapse. Another method to avoid the negative effects of network congestion is implementing priority schemes, so that some packets are transmitted with higher priority than others. A third method to avoid network congestion is the explicit allocation of network resources to specific flows.

In computer networking, network traffic control is the process of managing, prioritizing, controlling or reducing the network traffic, particularly Internet bandwidth, e.g. by network scheduling as a part of bandwidth management. In order to use these tools effectively, it is necessary to measure the network traffic to determine the causes of network congestion and attack those problems specifically. In scheduling, different goals often conflict (e.g. throughput versus latency), and thus a scheduler will implement a suitable compromise. Preferences are given depending upon the user's needs and objectives with respect to e.g. throughput, latency, response time and fairness/waiting Time. Scheduling deals with the problem of deciding which of the outstanding requests is to be allocated resources. There are many different scheduling algorithms.

Quality of Service (QoS) is the overall performance of a telephony or computer network, particularly the performance seen by the users of the network. Quality of service is particularly important for the transport of traffic with special requirements.

Quality of service includes the ability to provide different priority to different applications, users, or data flows, or to guarantee a certain level of performance to a data flow. To quantitatively measure quality of service, several related aspects of the network service are often considered or may be guaranteed, such as a required bit rate, error rates, bandwidth, throughput, transmission delay, availability, jitter, packet dropping probability etc. Quality of service guarantees are important if the network capacity is insufficient, especially for real-time streaming multimedia applications such as voice over IP, online games and IP-TV, since these often require a fixed bit rate and are delay sensitive, and in networks where the capacity is a limited resource, for example in cellular data communication.

A network or protocol that supports QoS may agree on a traffic contract with the application software and reserve capacity in the network nodes, for example during a session establishment phase. During the session it may monitor the achieved level of performance, for example the data rate and delay, and dynamically control scheduling priorities in the network nodes. It may release the reserved capacity during a tear down phase.

A best-effort network or service does not support quality of service. Best-effort delivery describes a network service in which the network does not provide any guarantees that data is delivered or that a user is given a guaranteed quality of service level or a certain priority. In a best-effort network, all users obtain best-effort service, meaning that they obtain unspecified variable bit rate and delivery time, depending on the current traffic load. The Internet protocol offers a best-effort service of delivering datagrams between hosts. Those may be lost, arbitrarily delayed, corrupted, or duplicated An alternative to complex QoS control mechanisms is to provide high quality communication over a best-effort network by over-provisioning the capacity so that it is sufficient for the expected peak traffic load. The resulting absence of network congestion eliminates the need for QoS mechanisms.

QoS is sometimes used as a quality measure, with many alternative definitions, rather than referring to the ability to reserve resources. Quality of service sometimes refers to the level of quality of service, i.e. the guaranteed service quality.

In computer science, a cache is a component that transparently stores data so that future requests for that data can be served faster. Fetching data from its original storage location is comparatively slower. Hence, the greater the number of requests that can be served from the cache, the faster the overall system performance becomes. Caches are implemented as a block of memory for temporary storage of data likely to be used again and are frequently used by web browsers and web servers. By cashing, web pages can be quickly retrieved the next time that page is requested, since the cache has it already stored and can load it into the user's browser quicker than having to retrieve them from the Web site of the server's remote site. A proxy cache, or a web proxy cache, is a function of a proxy server that caches retrieved Web pages on the server's hard disk so that the page can be quickly retrieved by the same or a different user the next time that page is requested. The proxy cache eases bandwidth requirements and reduces delays that are inherent in a heavily trafficked, Internet-connected network.

Mobile data offloading is the use of complementary network technologies for delivering data originally targeted for cellular networks. The mobile offloading action can be set by either an end-user or an operator. End users do data offloading for data service cost control and the availability of higher bandwidth. Operators do it to ease congestion of cellular networks. The main complementary network technologies used for mobile data offloading are Wi-Fi, femtocell and Integrated Mobile Broadcast. Wifi is a popular technology that allows an electronic device to exchange data or connect to the internet wirelessly using radio waves. The name is a contraction of "Wireless Fidelity".

The increasing need for offloading solutions is caused by the explosion of Internet data traffic, especially the growing portion of traffic going through mobile networks. This has been enabled by smartphones and other user devices possessing Wi-Fi capabilities together with large screens and different Internet applications, from browsers to video and audio streaming applications.

Mobile network traffic is growing exponentially, and service providers must manage their networks efficiently to meet consumer demand since the spectrum available for mobile data applications is limited. The trend is now to decreased cell size and deploying small cell technologies instead.

The most efficient way to use small cells is to position them in locations where significant amounts of data are generated (shopping malls, stadiums, university campuses, public transportation hubs, etc.) and where subscribers spend most of their time and therefore consume significant amounts of data (homes, offices, etc.). There are already millions of installed Wi-Fi networks mainly in congested areas such as airports, hotels and city centers and the number is growing rapidly. By means of Wi-Fi, one of the small cell technologies, many operators has a cost-effective way of offloading large amounts of mobile data traffic while delivering a variety of new services.

As a summary, solutions exist for content delivery that takes network resources into account for estimated traffic loads. Methods using best-effort, over-provisioning, and scheduling algorithms to avoid congestion and to guarantee a given quality of service are known. Because of increasing popularity of smartphones and other mobile user devices the resulting explosion in data traffic, many businesses are focusing on making sure their services perform at their best.

An example of such a solution is The Nokia Siemens Network (NSN) Operator Content Delivery Network (CDN) that enables operators to dynamically allocate network resources and optimize content to control its delivery right down to the user device.

The solution integrates the capabilities of Global CDN providers with the mobile network's sophisticated control and optimization functions. The software involved can foresee critical developments and take necessary actions before a major incident happens.

Mobile broadband performance changes constantly, with spikes in demand, causing congestion and quality impairment. The service enables improving the customers' experiences ahead of time by predicting changes in applications traffic mix.

The service analyzes and improves accessibility, stability and speed of the mobile broadband performance. It enables users to get online without problems, retain a stable connection, and load online pages and applications faster. Further it can identify and boost performance of the most popular applications in the network such as Facebook, Netflix or YouTube.

US20130091249 A1 is mentioned as prior art describing a streaming server and a method for determining if a congestion level within a network exceeds a predetermined threshold and when this occurs, transmitting one or more lower bit rate segments of a content stream to a client.

In EP 2 403 290 A1, a mobile telecommunications network includes a core and a radio access network having radio means for wireless communication with mobile terminals registered with the network, wherein the radio access network includes control means operable to control the use of network resources by the mobile terminals.

OBJECT OF THE INVENTION

The object of this invention is a dynamic solution for delivering satisfying quality of service to clients on the basis of real-time capacity needs.

SUMMARY OF THE INVENTION

The method of the invention is concerned with for content delivery of services in a mobile telecommunication network on the basis of predictions of user and network needs. It is mainly characterized by collecting and receiving information of the use of services in the network, and analyzing network behavior on the basis of the information received. The traffic load in the network is continuously monitored in real-time by estimating the traffic load locations in the network and the network capacity needs for delivering the services. The analysis is used for deciding the optimal network configuration to be used for supporting the estimated traffic load locations in the network. The network behavior is controlled based on the selections and decisions of the analysis by sending requests to network components for network configuration.

The system of the invention for content delivery of services in a mobile telecommunication network comprises a server of a mobile operator that has inventive components. An optimization device collects and receives information of the use of services in the network and analyzes network behavior on the basis of the information received and collected by estimating the traffic load locations in the network and the capacity needs for delivering the services. The optimization device has means for deciding the optimal network configuration to be used for supporting the estimated traffic load locations in the network, a network control unit for controlling the network behavior based on the selections and decisions made and means for sending requests to network components for network configuration.

The service program product of the invention used for delivering content of services in a telecommunications network comprises software that when run on a computer readable medium performs the steps of the method of the invention.

The preferable embodiments of the invention have the features of the sub claims. The system of the invention is further characterized by selected caches and/or proxy caches in the network for content delivery of the services and the network elements to be controlled include the caches and/or proxy caches for storing content of services to be delivered and the network behavior analysis can additionally be performed for selecting caches in the network to support the estimated traffic load locations in the network, whereby the network behavior is controlled by sending content of services to the selected caches in the network. Also previous information of the use of services in the network is taken into consideration in the analysis.

The data content of the service to be delivered can be preprocessed by creating several quality versions of the service and sending selected quality versions of the service to selected caches in the network. One or more quality versions of the service to be delivered are selected for supporting the needed network capacity on the basis of the analysis. The data preprocessing might include individually tailoring the Quality Of Service (QoS) versions for the users on the basis of Quality Of Service (QoS) preferences, user profiles, device properties of the end user device, and/or contracts. The optimization device for collecting and receiving information further comprises means for selecting a quality version of the service to be delivered and consumed for supporting the needed network capacity on the basis of the analysis, The information of the use of services in the network includes network information of times and locations for traffic loads and peaks, congestion, and traffic patterns based on previous information. The information of the use of services by users include usage and location of mobile terminals as well as information of Quality Of Service (QoS) preferences and further it might include mash-up information about applications, type of service, trends of service usage, equipment information of user terminals, connected service providers, user profiles and content information.

The monitoring of the traffic load includes estimation of both location and time for traffic loads for the service to be delivered and consumed.

The network behavior is further controlled by defining routing, delay, throughput, latency, packet loss and signal to noise ratio of the service to be delivered. Furthermore, it can be controlled by prioritizing given users with respect to delivery of content or the Quality Of Service (QoS) of the content to be delivered.

The invention provides a dynamic solution for delivering satisfying quality of content to a user of mobile network by taking into account the current state of the network, analyzing probable future states of the network based on the mobility of users, the content the users are consuming and the predicted content usage in the network.

The invention follows trends in what and when people use services, where the content of the service is consumed and from what kind of a device. The network traffic is constantly monitored and the network behavior is analyzed and controlled. Based on the analysis made in accordance with the functions of the software program product, the operator can automatically optimize its network behavior and define values for parameters defining the overall operation. The invention brings a new aspect in that the network behavior is not only controlled with respect to the configuration of the network but also by taking the above mentioned trends and facts in service use into consideration, since the invention also e.g. monitors the behavior of individual users of the services for input information regarding information of the use of services.

Different factors are taken into consideration when making decisions in defining the values for the parameters with respect to the optimal network configuration to be used for supporting the estimated traffic load in the network. These factors are e.g. concerned with required network resources to certain areas, data encoding, signal coding, antenna configuration, bandwidth control, cell size, routing, bit rate, frequency reuse and spectrum sharing.

In addition to watching the network with respect to these parameters regarding network configuration and for network behavior for unusual events or trends it is possible also to generally note unusual actions or departures from normal operation, optionally also with respect to slow or failing components and take these factors into consideration in a the real-time analysis and by reacting with modifying the decisions and selections to be performed.

The invention delivers real-time visibility into what users are doing in the network and how they are using applications and services. This view provides the decision support information needed to meet Quality of Service demands in content delivery.

Critical network parameters are in this way detected in real time and changes in the decisions can be made in time to avoid disturbances in content delivery. Changes can be made in any decision or parameter with respect to e.g. cache distribution, data encoding, signal coding, bandwidth, cell size, routing, bit rate, frequency reuse, antenna configuration and/or spectrum sharing.

A practical solution is to determine standard values for the network parameters for normal traffic loads in the different parts of the network. Thus, in order for the method of the invention to be optimally effective, a basic solution of normal network or user behavior is first established over a period of time. Once certain parameters have been defined as normal, any departure from one or more of them is flagged as anomalous and acted on by performing real-time changes to be done in the estimations and predictions of the network behavior and optimizing the network behavior and configuration accordingly.

The network behavior is controlled by sending requests to network components both for network configuration and preferably also by delivering the content of the service to decided caches in the network. The network behavior is based on the analysis and the estimation from the information received both with respect to user information and network information.

The service of the invention thus takes different factors into consideration in deciding an optimum content delivery solution.

The software of the service program product collects information about factors influencing on the network capacity need and traffic load and then analyses the information and makes decisions by selecting values for parameters that control the network behavior in order to avoid congestion and other network problems. The decisions made by the software are e.g. based on the estimated mobile usage in for a certain content at a certain time based on received data from a service provider for the content.

In this connection, the maximum traffic possible before congestion is determined by taking into consideration traffic peaks and patterns for certain times and optionally locations when estimating the total traffic load in certain situations.

The network behavior to be realized is based on decisions for determining the quality of service for certain services and users, decisions of network configuration settings, and preferably decisions of caches for delivering the content.

The decision of the quality of service for the content to be delivered to a specific user can be based on the device properties of the end user device and certain contracts and rights to a specific quality of service.

The issues of decisions, with respect to deciding caches for the content to be delivered are based on estimating the traffic load and time for traffic loads for particular contents.

There are several cooperating parts in the system of the invention, namely the service provider that e.g. can be a mash-up provider, especially a Mashup TV service provider, and provides the service and sends the information of the use of services to the optimization device, the mobile network operator, the user of both services, i.e. the services provided by the service provider and the mobile network operator, optionally an offloading network, like a Wifi network, and optionally individual content providers that use the mobile operator services to deliver content to users, e.g. individual users of mobile devices who is streaming content to the internet.

A user might use only the network from the network operator that provides both mobile and fixed connectivity to users' devices as its basic task but might in addition also use certain special services from the operator, which can even work as the content provider for mash up services. The mobile network operator of the invention performs additional intelligence in accordance with the functions executed by the software program product of the invention. Partly, the functions are performed by a network control unit and a predictive content delivery optimization device, hereafter called optimization device.

The functions include collecting network information of times and locations for traffic peaks, congestion, and traffic patterns based on previous information. It analyses traffic patterns and figures out what areas get congested in certain times, locates traffic peaks, notes the type of content used in certain locations and at what times (noting e.g. typical work traffic times that influence etc). Furthermore, the operator provides services for users by guaranteeing a certain level of service, like according to agreed mashup service support packages where the service might come from one of its own subsidiaries or outside from a service provider.

Furthermore, the mobile operator provides content caches and caches popular material in the mobile network in accordance with the decisions made by the software program product of the invention. The operator informs the service provider about the network traffic and provides a cache for the service provider in its own CDN network, possibly in connection with the base station. The overall analysis shows the preferable caches to be used and what applications and services to be cached. The operator can also reserve a given part of a cache or a cache to the service provider and the service provider can itself decide what to cache therein.

The mobile system operator can use other wireless radio technologies to support its operations, i.e. it can rent capacity from other mobile operators or it can use Wifi services for e.g. offloading. If, e.g., the mobile network operator knows that there is a working Wifi network in the area, it can offload some traffic to use such a network by means of e.g. switches from the operator's network to some other radio network, like Wireless Local Area Networks (WLAN). The Wifi network to be used can be a system of WLAN networks, (it might be even the operators own network). In alternative, the Wifi network can be an individual hotspot owned by a store (Starbuck etc) or it might even be a privately owned network. The use of these Wifi networks will work on the basis of cooperation agreement contracts. The optimal network configuration includes decisions with respect to data offloading to extended networks, which can be Wifi networks, being in that way parts of the telecommunication network for content offloading.

The mobile network operator can also make network switching between other types of networks, such as such as Long-Term Evolution (LTE), Enhanced Data rates for GSM Evolution (EDGE) etc. Furthermore, even if a user has a contract which allows only the use of older generation networks (2G, 3G, EDGE) but has a device that would support newer technologies (LTE), the operator can move the users traffic temporarily to that network.

The service provider of the invention provides information of popular trends and predicts future trends and informs exact information of the content, i.e. information of popular programs users follow and where they consume it and shares the information with the mobile network operator so that the mobile network operator can use the information in its analysis.

With the advanced analytics performed by the predictive content delivery optimization device, it is also possible to predict the future behavior of the users. Based on the knowledge of the past behavior and the knowledge gained from understanding the user behavior it is possible to predict where the congestion is going to happen in the near future. Also it is possible to figure out how the current congestions are going to behave, where they might form, how they move and when and where they might break up.

It is for example possible, from a daily commute between work and home, to predict with a high probability, the location, wherein a huge consumption spike on data traffic will take place. In those cases, the mobile network operator can prepare for the oncoming consumption in certain areas, it can e.g. relocate the already existing customers on that area to different networks, to other network operators, or offload their consumption to a Wifi network. It is also possible to estimate how long these stationary content consumers will stay in the area and use that information to decide when and to which alternate network to move them.

It is also, by just looking at the traffic patterns of certain user groups, possible to predict where they will be and figure out the locations for multiple users in a near future. There might e.g. be a concert or sports event going on, where the users are heading. In those cases, the network operator can analyze the need of capacity for that area, react to the situation in advance in a way that the users are not even aware of the congestion in the area. The only thing they might notice is that the image quality of some services might be downgraded, but the content will be delivered to them smoothly thanks to the invention.

Also the mobile network operator is able to tell from the analyzed information that not only is there going to be a huge consumption spike in the area, but there will be individual service providers that will be streaming content to others and optimize the network to support the increase of data traffic away from the area as well.

The service provider, in turn, gets analyzed information of users and user groups, and general information of what other services users are using to help the service provider in improving its services. In other word, the service provider gets more precise location and device information, what content is consumed and in which kind of locations and with what kind of devices. The service provider can use the information to better predict user and user group behavior and provide customized offers for content or advertisement. When e.g. the location is known, location based advertisements can be more accurate and they can be matched to location based consumption behavior models.

The mobile network operator also collects information of devices (e.g. type of device, what functions it has, if it e.g. is a smart phone or basic phone, a high tech or low tech phone, etc.), areas (where they are used), user profiles (including information of gender, age, income, consumption habits, education, profession, usage group of mobile services (voice caller, text message writer, shopping person, browser, game player, etc), other service providers used by the users (where feeds are going), and content (what is followed and used by users) as a part of the invention by placing or storing the information in its predictive content delivery optimization device that receives information of use of services as realized by the software program product at the mobile operator.

When the predictive content delivery optimization device e.g. notices traffic caused by individual content providers that send content to others to be viewed, it can optimize the network in such a manner that the content can be delivered as smoothly as possible. It can find the users that are consuming the content provided and optimize the operation of the network so that it gives the best possible support for the sending and receiving of the content for example by deciding the best strategy to directly cache the content near multiple consumers of the material. If it notices that there are a multiple of such individual content providers in a small area, it can optimize the network to support them. Furthermore, if it is aware of an event in the area (like a sport event or a music concert) it can estimate in advance the type of content load that might be streamed out from that area and be prepared in advance for how to support it.

The service provider (also called content provider), like a mashup TV service provider, can
- provide customized tv, social media, and/or other mashup feeds based on user desires, including feed from (TV, twitter, facebook, google+, youtube, news services etc)
- analyze trends on what is popular and predict future trends
- do analyses on devices used, area information (like where given devices are used), user profiles, service providers (where the feed takes place), content (what users are is following The invention is especially useful for a mashup service for delivering content from TV to mobile smart phones and to other user devices or for services combining content from different sources, such as TV, Twitter, Facebook, Google+, Youtube, News, web services, etc and receiving popular content from other sources. The Mashup TV service provider provides customized services based on users' desires that can include feeds from these sources. Examples of Mashup providers are TV makers (like Samsung Smart TV), Apple iTV, Google Chromecast, Matcha.tv (bought by Apple).

From the users' perspective, the mashup service can be produced by the user's own computer by means of a service provided by a service provider elsewhere in the network. The service is coproduced by a mobile network operator and the service provider.

In the invention, the mash-up service provider and the operator cooperate by
- sharing analytics results with each other. The operator can guarantee that the users of the mashup service will have a certain amount of the total network capacity, reserve certain amount of cache for mashup use etc. Analytics information to be delivered between these parties in the system might involve e.g. application prioritization. There can be additional services for some of their applications that gain priority.
- communicating about traffic load by e.g. the Mashup service provider detecting trends on their feeds and telling the operator about them so that the traffic load can be estimated more accurately. The mashup service provider can warn the operator about coming events/ services that might create extra traffic in the network. This information of the use of services is sent from the service provider to a device in a server managed by the operator.
- communicating about users by e.g. the operator providing detailed location information regarding the users. Based on this information the mashup service provider can provide content material to be cached on different cache locations for the operator. If it e.g is expected that a lot of people will be watching a certain episode from a program from the last night, the episode can be cached as close to that area as possible.

The service of the invention creates an optimum content delivery solution with respect to network resources and user demands on the QoS of the required content.

The invention provides a service that upon receiving user information from the mobile network and other sources dynamically can guarantee a higher level of service to users, especially to prioritized users having the right to a given Quality of Service. The service can also provide priority access to selected over-the-top (OTT) services. Operators can in this way, by means of the software program product of the invention, take an active role in content delivery. The invention can also guarantee the performance of the services and generate revenue by offering customers new and differentiated services. Also the content provider can have access to more accurate information about user group behavior, what kind of content they consume in different situations/ locations and with what kind of devices.

The software program product of the invention acts in a proactive way with continuous active network monitoring based on an early detection of unusual network behavior and other actual information. Thus, the performance of the services is guaranteed by anticipating changes in user behavior.

This leads to more efficient use of network resources, cost saving, enhanced operator services, and new revenue streams.

In the following the invention will be described by means of some preferable embodiments by means of figures. The invention is not restricted to the details of these embodiments.

FIGURES

DETAILED DESCRIPTION

Figure 1:
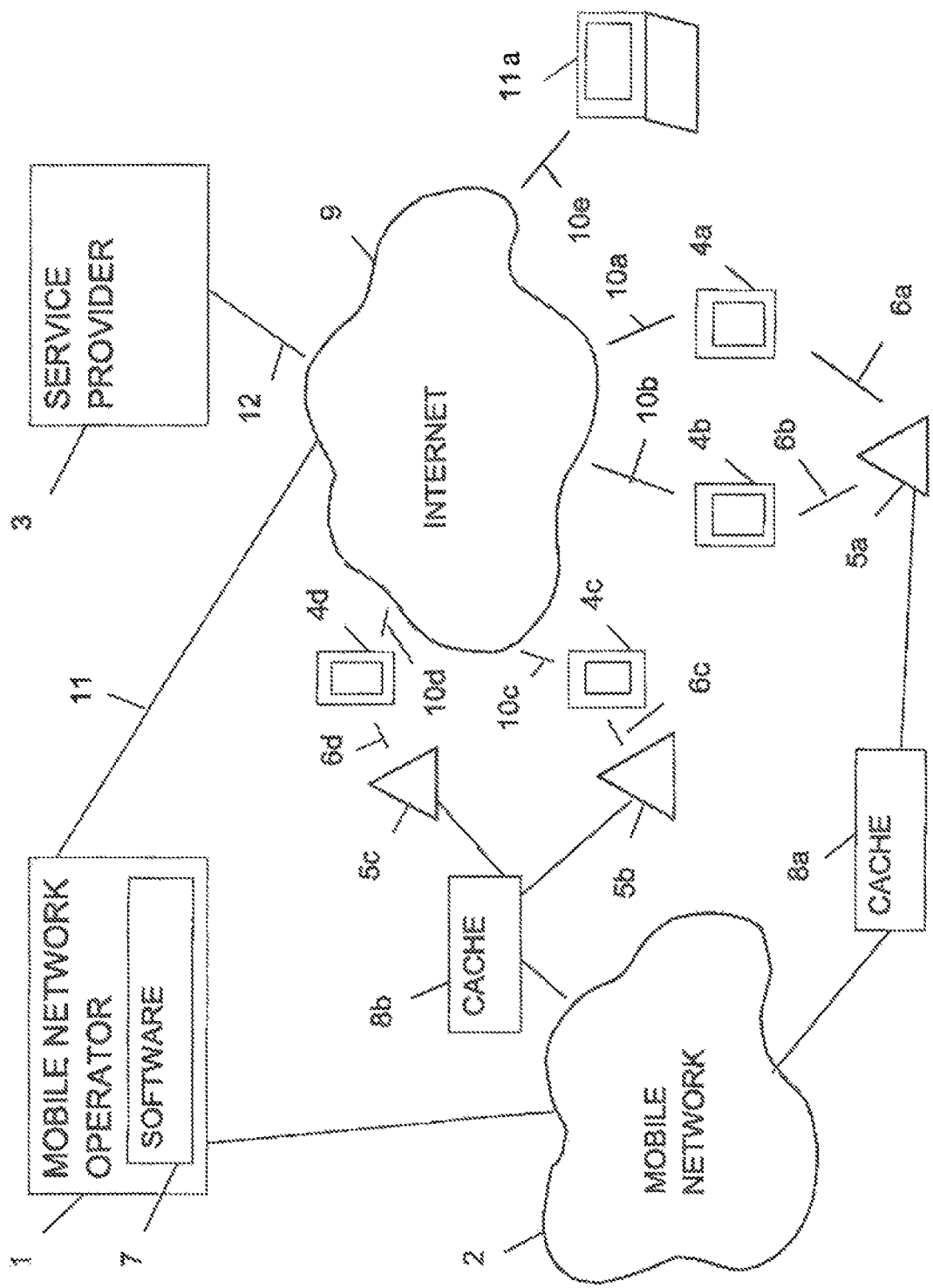
FIG. 1 is a schematic view of an example of a network, wherein the invention can be implemented.

FIG. 1 is a schematic view of an example of a telecommunication network, wherein the invention can be implemented.

The network comprises a mobile network operator 1 that provides connectivity to user devices through a mobile network 2. The mobile network can e.g. be based on the Global System for Mobile Communication (GSM) standard for digital wireless communications.

The GSM network has different parts. The Mobile Stations (MS) that can be seen in FIG. 1 have the reference numbers 4a, 4b, 4c and 4d being user devices carried by the user. A cell is formed by the coverage area of a Base Transceiver Station (BTS) (shortly called "base station") having the reference numbers 5a, 5b and 5c in FIG. 1, which serves the mobile stations MS in its coverage area. The mobile stations 4*a* and 4*b* are served by base station 5*a*, mobile station 4*c* is served by base station 5*b* and mobile station 4*d* is served by base station 5*c*. The Mobile Stations and the Base Stations communicate across the air interface through radio links 6*a*, 6*b*, 6*c* and 6*d*.

The communication from the base station subsystem to which the base stations belong is usually based on signaling system no. 7 (SS7) protocol (a global standard for telecommunications), which is indicated as the mobile network 2. Also other protocols with different communication standards can be used.

In addition to connectivity, the mobile network operator distributes content of mash up services to users provided by a service provider 3 by means of a Content Delivery Network (CDN). The Content Delivery Networks (CDN) helps to distribute content provided by the service provider 3 over the Internet by ensuring both high availability and high performance. The mobile network operator 1 provides caches 8*a* and 8*b* for the service provider 3 in its own CDN network in connection with the base stations 5*a*, 5*b* and 5*c*. There might be one or more base stations connected to each cache from which the content of the service can be downloaded or streamed to the user devices. In FIG. 1, cache 8*a* is connected to base station 5*a* and cache 8*b* to base stations 5*b* and 5*c*.

Instead of ordinary caches or in addition to them, there can be proxy servers with proxy caches, which can modify and perform packing of contents to be delivered.

The Content Delivery Network (CDN) is on top of the mobile network 2 containing caches/proxies with copies of data, placed at various points in the mobile network 2 so as to maximize bandwidth for access to the data content of the service from the service provider 3 throughout the network. A user accesses a copy of the data of the content of the service to be used near to the user device to avoid accessing the same central server and cause congestion.

Furthermore, the mobile network operator 1 of the invention performs additional intelligence in accordance with the functions executed by the software program product of the invention indicated by reference number 7. Thus, the mobile operator 1 provides the content caches 8*a* and 8*b* and caches popular material in the mobile network in accordance with the decisions made by the software program product 7 of the invention.

In FIG. 1, the user devices 4*a*, 4*b*, 4*c* and 4*d* are also wirelessly connected to the internet 9 by wireless links 10*a*, 10*b*, 10*c* and 10*d* but do not have to be. FIG. 1 also shows one user device 11*a* being connected to the internet 9 through the wireless link 10*e*. At least a part of the user devices usually belong to the mobile network and are connected to the internet through the mobile network. The user device can be a smart phone, laptop, table computer or other user device. Also the mobile operator 1 is connected to the internet 9 by link 11.

From the users' perspective, the mashup service can be produced by the user's own device 4*a*, 4*b*, 4*c* and 4*d* or computer 11*a* by means of a service provided by the service provider 3.

The service is coproduced by the mobile network operator 1 and the service provider 3 and delivered in accordance with different decisions on network configuration and cashe distribution in accordance with analysis of estimated traffic load in order to ensure sufficient quality of the service. It is also possible for the service provider 3 to deliver the service directly to a user device 4*a*, 4*b*, 4*c* and 4*d* through the internet 9.

The estimation is based on information from both the mobile network provider 1 and the service provider 3. The service provider 3 and the mobile network operator 1 therefore communicate about factors influencing on traffic load through the internet. The service provider 3 is connected to the internet 9 by link 12.

Figure 2:
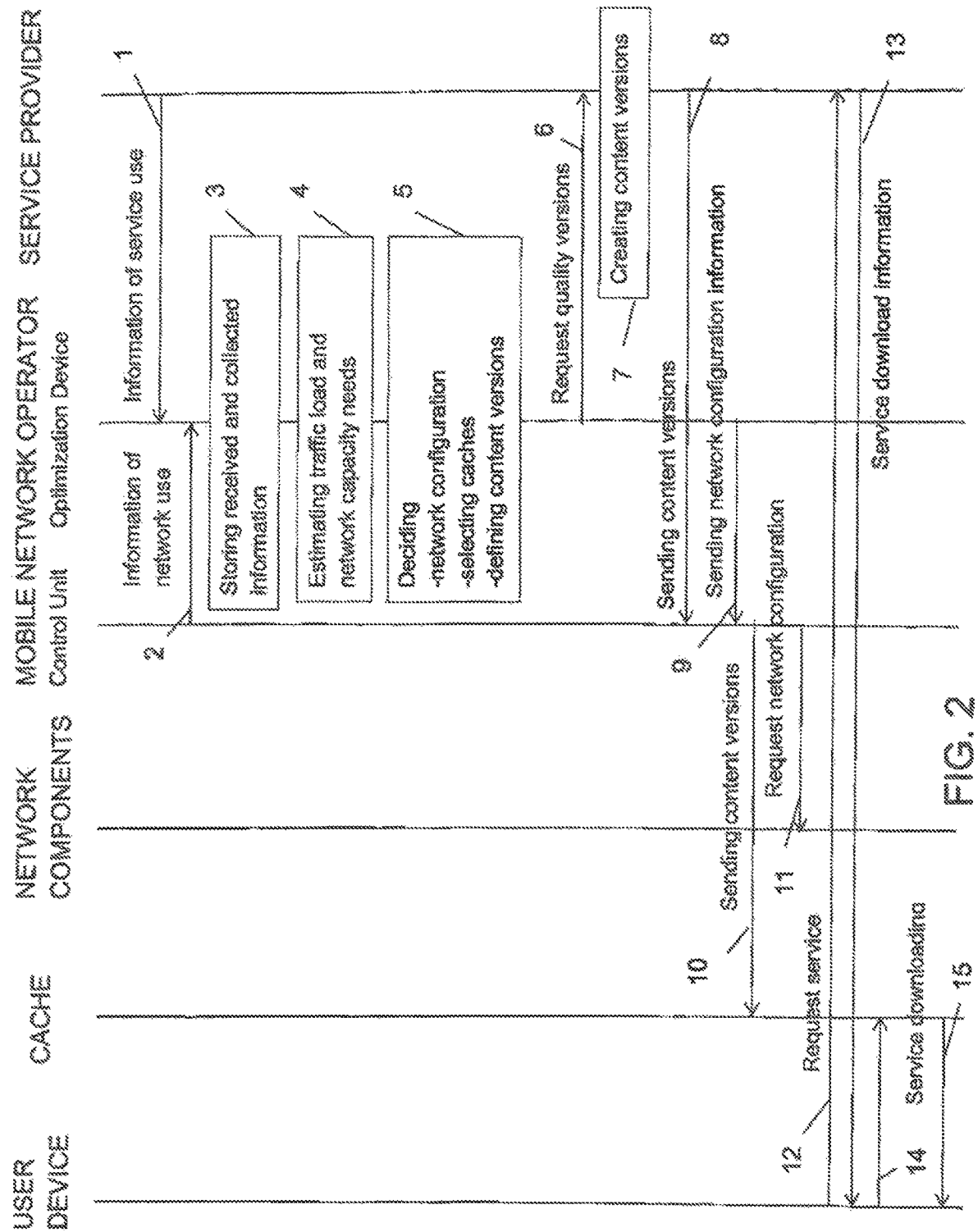
FIG. 2 is a signal diagram of an embodiment of the method of the invention as implemented in the network of FIG. 1.

FIG. 2 is a signal diagram of an embodiment of the method of the invention as implemented in the network of FIG. 1.

The service provider uses the mobile operator for delivering content to mobile smart phones such as for mashup services by combining content from different sources.

As the network has a certain capacity, the mobile network operator and service provider cooperate in order to predict the overall capacity needed. The available network capacity used has to be economized by e.g. controlling the different factors of network configuration. In order to ensure a sufficient quality of service in situations, wherein the network capacity is limited, related aspects are considered, such as required bit rate, error rates, bandwidth, throughput, transmission delay, availability, jitter, packet dropping probability etc.

The services to be delivered are created in accordance with user demands. The management of the quality of service aspect involves the creation of several quality versions of the service content to be used for different situations of availability of network capacity.

The scenario of FIG. 2 shows an example of a signaling between a particular user device and the other parties involved.

In signal 1, the service provider sends information of the use of the service to a predictive content delivery optimization device of the mobile network operator. The service provider sends information of trends on the use of services of users, predicts future trends of the use and informs exact information of the content used.

In addition to the information sent with signal 1 from the service provider, the mobile operator also collects mobile network information sent with signal 2 from the network control unit of the mobile network operator to the predictive content delivery optimization device. The mobile network information includes information of devices, areas of use, user profiles and network status information regarding congestion and current network configuration.

In step 3, the predictive content delivery optimization device of the mobile network operator stores all information received and collected as realized by this function of the software program product of the invention situated at the mobile network operator.

In step 4, the network behavior is analyzed by the predictive content delivery optimization device on the basis of the information received and collected by monitoring the traffic load in the network and by estimating the traffic load and traffic load locations in the network for predicting the network capacity needs for delivering the services.

In step 5, the predictive content delivery optimization device uses the analysis for selecting caches in the network to support the estimated traffic load in the network by deciding the optimal network configuration and cache distribution, and optionally by defining one or more quality versions of the service content to be delivered for supporting the needed network capacity on the basis of the analysis. The analysis can also predict possible network components which might be breaking up and inform the network operator about future needs for repair.

In signal 6, the predictive content delivery optimization device requests the service provider to create and send one or more versions of quality of given services ordered and expected to be used by users. The quality versions requested are also defined in accordance with the estimated traffic load. The service provider might also be provided with additional information for improving its services.

The service provider creates several quality versions of the service content which is indicated in step 7.

In signal 8, the service provider sends the content versions of the service to the network control unit of the mobile network operator.

In signal 9, the predictive content delivery optimization device sends information of network configuration decisions to the network control unit.

In step 10, the network control unit sends selected content versions of the service as defined to selected caches in the network.

The network behavior is then controlled on the basis of the selections and decisions of the analysis so that the network control unit sends, in step 11, requests to network components for network configuration.

The created service can now be used by with higher efficiency of the user device. This takes place by requests sent by user device to the web site of the service provider illustrated by step 12.

As a reply to the user request, the service provider informs in signal 13, the user device of the location, i.e. from which cache, the service can be downloaded or streamed to the user device.

Signals 14 and 15 indicates the downloading/streaming of the requested service to the user device.

It is pointed out that the signal diagram of FIG. 2 is not a static one time scenario and is not considered with one user only. Instead, both the network operator and the mashup tv-service operator continuously follow up the network traffic caused by a lot of user devices that e.g. using services and making requests for using content of services provided by the service provider. They also analyze the changes of the situations in real time and use the above mentioned approach to modify their analyses and proactively react to the changes they have found out. Also if there are major changes in the environment (like special news bulletins) they can react to those in real time and optimize the network and the feed quality to serve their customers as well as they can and avoid congestion and disruptions. Also when they e.g. notice that a user has requested an upgraded quality, the changes needed to guarantee the delivery of the request are analysed and determined. If a certain user often request for upgrades, the service provider and the mobile operator can be made prepared. They can also consider which upgraded versions are possible within the network capacity to provide for the user. The versions to be provided are restricted in accordance with the quality requirements by the user and by the network capacity.

When the above signal diagram is adapted to a possible user case, it can be explained in the following way.

It is assumed that a user might want to watch a tv-series from last evening while commuting to work. He uses his mobile device to connect to his mashup tv-service provider's website and locates the TV series there (signal 12). He finds the tv-series by means of the service provider's instructions from signal 13 and starts to watch it after starting to download it (by streaming) (signals 14 and 15).

It is assumed that, in this case, the streaming is steady, but the quality is not satisfying since the default quality version selected in advance to be delivered in the first hand by the software program product of the invention is lower than normal.

The service provided by the service provider offers an updated quality of the service for a fee belonging to the user's service package according to the contract with the service provider. Some of the quality options might not be available due to the heavy load of network traffic. When the user chooses the upgraded quality and continues to watch the tv series show, the streaming still works but having a clearly better picture quality. It is now assumed that the user continues to watch the tv-show until the end of the commute, when he saves the spot and finishes it later.

In the afternoon when he is coming back from work, he stops at a coffee shop and watches the rest of the tv series from his tablet. Now, the quality of the show is high even without any updates in the streaming quality.

The Mashup TV-service provider has followed the feed it receives and analyzed it. It notices that the show in question is something that this user has been watching. They have pinpointed the user because his account is linked with a service operator they are co-operating with and the user has according to the contract the right to highest quality of the service, which can be guaranteed with high enough QoS (quality of service).

The Mashup TV-service provider has analysed the whole user group with certain characteristics that are following it as well. It predicts the probable times for when the user group and this user are watching the tv series and from what kind of devices.

It then informs the service operator about the content that according to the prediction will be popular for example the next day and the probable times of watching and the type of devices used to follow it. The mobile operator gets the statistics of the user groups that are going to create a load in the near future. It also gets information of users that have a service package for quality of service for their data/mashup-tv service. With the information received from the mashup-tv service provider and its own data, it analyses the user group further and makes an analysis of the probable locations for watching the content. It adds the additional information of the customers (like information of agreed Quality of Service to the information. From that information it estimates the coming traffic load and on the basis of available network capacity and need, it decides in what quality can be ensured to those customers so that there will be no delay issues or stops in the feed they are following. It also selects the caches to store the feed (the quality versions of the requested services) in order to avoid congestion.

At this point it can also send some of the analyze results to the mashup-tv service operator and request the feed to be sent for the selected network caches. There will be different quality levels of the feeds, which can be done by the service provider situated either under the mashup-tv-service operator or the network operator as indicated above. When the mobile operator gets the different feeds in (the different quality versions of the contents of the service to be delivered it stores them on proper locations with signal 12 at different caches to be downloaded by user devices. It also decides the network configuration to be realized. In practice, it is question about the needed changes for the network topology (like antenna configurations) based on the estimated load since there is a basic network configuration used. The telecommunication network has determined standard values for the network parameters in accordance with the normal traffic loads in the different parts of the network.

The invention claimed is:

1. A method of content delivery of services in a mobile telecommunication network on the basis of predictions of user and network needs, the method comprising:

collecting and receiving information of use of services in the network from a content service provider and a mobile network operator;

analyzing, by the mobile network operator, network behavior based on the information received from the content service provider and the mobile network operator, the analyzing including:
continuously monitoring, in real time, traffic load in the network for delivering the services,
estimating an estimated traffic load, including traffic load locations in the network and network capacity needs for delivering the services, from at least said continuously monitoring traffic load, and
noting unusual actions or departures of the traffic load for delivering the services from normal operations, based on the analysis:
deciding an optimal network configuration to be used for supporting the estimated traffic load locations in the network,
selecting caches, including cache distribution, in the network to support the estimated traffic load locations in the network,
reacting to the unusual actions or departures noted by modifying the deciding and the selecting, and
defining several quality versions of a service in accordance with the estimated traffic load; and
controlling the network behavior, the controlling including:
sending content of services to the selected caches in the network, wherein data content of the service is preprocessed, the preprocessing including creating the several quality versions of the service and individually tailoring the quality versions for the users on the basis of three or more of Quality Of Service (QoS) preferences, user profiles, device properties of the end user device, or contracts, wherein the sending includes sending at least one of the several quality versions based on the analysis,
delivering, by each selected cache storing at least one of the several quality versions of the service, related stored service content to user devices responsive to service requests by the user devices to a service provider; and
based on the selecting and the deciding, sending requests to network components to switch over to the decided optimal network configuration.

2. The method of claim 1, wherein said analyzing network behavior includes determining, by the mobile network operator, probable locations for a particular user group to consume types of content that are popular for the user group based on the information of the use of services from the content service provider, which includes the types of content that are popular for the user group, probable times for the user group to consume the types of content, and types of devices the user group uses for the consumption.

3. The method of claim 1 wherein slow or failing components are noted as unusual actions reacted to by modifying the decisions and selections to be performed.

4. The method of claim 1 wherein the service to be delivered is customized as a mashup service by combining content from different sources as tv, social media, and/or other mashup feed based on user desires.

5. The method of claim 1 further comprising selecting a quality version of the service to be delivered for supporting the needed network capacity on the basis of the analysis.

6. The method of claim 1 wherein the data preprocessing further includes individually tailoring the QoS versions for the users on the basis of the QoS preferences, the user profiles, the device properties of the end user device, and the contracts.

7. The method of claim 1 the information of the use of services in the network includes network information of times and locations for traffic loads and peaks, congestion, and traffic patterns based on previous information.

8. The method of claim 1 wherein the information of the use of services by users include usage and location of mobile terminals as well as information of the QoS preferences.

9. The method of claim 1 wherein the information of the use of services includes mash-up information about applications, type of service, trends of service usage, equipment information of user terminals, connected service providers, the user profiles and content information.

10. The method of claim 1 wherein the monitoring of the traffic load includes estimation of both location and time for traffic loads for the service to be delivered and consumed.

11. The method of claim 1 wherein the network behavior is further controlled by defining routing, delay, throughput, latency, packet loss and signal to noise ratio of the service to be delivered.

12. The method of claim 1 wherein the network behavior is further controlled by prioritizing given users with respect to delivery of content or the Quality Of Service (QoS) of the content to be delivered.

13. The method of claim 1 wherein the optimal network configuration includes decisions with respect to data encoding, signal coding, bandwidth, cell size, routing, bit rate, frequency reuse, antenna configuration and/or spectrum sharing which parameters are included in the requests sent to network components for network configuration.

14. The method of claim 1 wherein the network elements to be controlled include the caches and/or proxy caches for storing content of services to be delivered.

15. The method of claim 1 wherein the optimal network configuration includes decisions with respect to data off-loading to extended networks.

16. A system for content delivery of services in a mobile telecommunication network, the system comprising:
caches in the network for content delivery of the services;
a server of a service provider for preprocessing data content of a service to be delivered, the preprocessing including creating several quality versions of the service, individually tailoring the quality versions for users on the basis of at least three of Quality Of Service (QoS) preferences, user profiles, device properties of end user devices, or contracts, and sending selected quality versions of the service to at least one selected cache of the caches in the network; and
a server of a mobile operator, the server having a computer program stored thereon which when executed by a processor causes the processor to:
collect and receive information of use of services in the network from service providers and the mobile operator, wherein the information of the use of services includes mash-up information about applications of users and service providers connected to the users;
analyze network behavior based on the information received and collected from both the content service provider and the mobile operator, wherein the network behavior includes a behavior of a user group, which indicates types of content the user group consumes in different situations and types of devices the user group uses for the consumption, the analyzing including:
  continuously monitoring, in real time, traffic load in the network for delivering the services;
  estimating estimated traffic load locations in the network and capacity needs for delivering the services from at least said continuously monitoring traffic load; and
  noting unusual actions or departures of the traffic load for delivering the services from normal operations;
based on the analysis:
  decide an optimal network configuration to be used for supporting the estimated traffic load locations in the network,
  select among the caches, including cache distribution, in the network to support the estimated traffic load locations in the network;
  react to the unusual actions or departures noted by modifying the decision and the selection, and
  control the network behavior, the control including, based on the selecting and the deciding, sending requests to network components to switch over to the decided optimal network configuration.

17. The system of claim 16 wherein the server of the service provider provides the service and sends the information of the use of services to the server of the mobile operator.

18. The system of claim 16 wherein in collecting and receiving information, the computer program, when executed by the processor further cause the processor to select one of the selected quality versions of the service to be delivered to at least one user device and consumed for supporting the needed network capacity on the basis of the analysis.

19. The system of claim 16 further comprising an extended network as apart of the telecommunication network for content offloading.

20. The system of claim 19 wherein the extended network is a Wifi network.

21. A non-transitory computer program storage medium to be used for delivering content of services in a telecommunications network, the storage medium having a computer program stored thereon which when executed by a processor of a mobile network operator causes the processor to:
  receive information of use of services in the network from a content service provider and the mobile network operator;
  analyze network behavior based on the information received from the content service provider and the mobile network operator, the analyzing including:
    continuously monitoring traffic load in the network for delivering the services,
    estimating an estimated traffic load including traffic load locations in the network and network capacity needs for delivering the services; and
    noting unusual actions or departures of the traffic load for delivering the services from normal operations;
  based on the analysis:
    decide an optimal network configuration to be used for supporting the estimated traffic load locations in the network,
    select caches, including cache distribution, in the network to support the estimated traffic load locations in the network,
    react to the unusual actions or departures noted by modifying the decision and the selection, and
    define several quality versions of a service in accordance with the estimated traffic load; and
  control the network behavior, the control including:
    sending content of services to the selected caches in the network, wherein data content of the service is preprocessed, the preprocessing including creating the several quality versions of the service and individually tailoring the quality versions for the users on the basis of at least three of Quality Of Service (QoS) preferences, user profiles, device properties of the end user device, or contracts,
    delivering, by each selected cache storing at least one quality version of the service, related stored service content to user devices responsive to service requests by the user devices to a service provider, and
    based on the selecting and the deciding, sending requests to network components to switch over to the decided optimal network configuration.

* * * * *